(12) United States Patent
Ishikawa et al.

(10) Patent No.: US 9,835,205 B2
(45) Date of Patent: Dec. 5, 2017

(54) FRICTION CLUTCH

(71) Applicant: DENSO CORPORATION, Kariya, Aichi-pref. (JP)

(72) Inventors: Keiji Ishikawa, Kariya (JP); Takayuki Hirose, Kariya (JP); Yoshiki Tada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/124,050

(22) PCT Filed: Mar. 9, 2015

(86) PCT No.: PCT/JP2015/001272
§ 371 (c)(1),
(2) Date: Sep. 7, 2016

(87) PCT Pub. No.: WO2015/136912
PCT Pub. Date: Sep. 17, 2015

(65) Prior Publication Data
US 2017/0016488 A1  Jan. 19, 2017

(30) Foreign Application Priority Data

Mar. 11, 2014 (JP) .................................. 2014-047423

(51) Int. Cl.
F16D 13/76 (2006.01)
F16D 27/112 (2006.01)
F16D 3/76 (2006.01)

(52) U.S. Cl.
CPC ............ *F16D 13/76* (2013.01); *F16D 27/112* (2013.01); *F16D 3/76* (2013.01)

(58) Field of Classification Search
None
See application file for complete search history.

(56) References Cited

U.S. PATENT DOCUMENTS

| 5,133,325 | A | * | 7/1992 | Winkelmann | .......... F02B 39/04 123/559.3 |
| 5,924,510 | A | * | 7/1999 | Itoh | .................... B60K 17/3505 180/197 |
| 6,209,191 | B1 | | 4/2001 | Tabuchi et al. | |
| 2001/0027905 | A1 | * | 10/2001 | Taureg | ................ F16D 25/0638 192/35 |
| 2011/0243766 | A1 | * | 10/2011 | Kimoto | ................. F04C 29/005 417/374 |

FOREIGN PATENT DOCUMENTS

JP    H06-193653 A    7/1994

* cited by examiner

*Primary Examiner* — Colby M Hansen
(74) *Attorney, Agent, or Firm* — Posz Law Group, PLC

(57) ABSTRACT

In an electromagnetic clutch, a rotor includes a cover portion that covers a radially outer end of an armature from a radially outer side. The cover portion, the radially outer end of the armature, and a wall of the rotor define a discharge passage that is formed into a ring shape centered on a rotating shaft and is open on a first end side in an axis line direction for discharging abrasion powder generated by friction between walls. The cover portion includes a tapered surface that is shaped such that an area in a cross sectional plane of the discharge passage which is orthogonal to an axis of the rotating shaft becomes larger toward the first end side in the axis line direction.

2 Claims, 7 Drawing Sheets

FIRST END SIDE ←— AXIS LINE DIRECTION —→ SECOND END SIDE

COMPARATIVE EXAMPLE

FRICTION CLUTCH

CROSS REFERENCE TO RELATED APPLICATION

This application is a U.S. national stage of International Application No. PCT/JP2015/001272 filed on Mar. 9, 2015 and is based on and incorporates herein by reference Japanese Patent Application No. 2014-047423 filed on Mar. 11, 2014.

TECHNICAL FIELD

The present disclosure relates to a friction clutch.

BACKGROUND ART

Up to now, as the clutch of this type, there is an electromagnetic clutch for transmitting a rotational driving force to a car air conditioning compressor from an external power source such as an engine through a belt (for example, refer to Patent Document 1).

In the above electromagnetic clutch, an electromagnetic coil of a stator is energized to form a magnetic circuit in which a magnetism passes through a rotor and an armature of a hub. With this configuration, the armature of the hub is attracted to the rotor by the aid of an electromagnetic force generated by the magnetic circuit. For that reason, the armature and the rotor come into contact with each other, and a friction occurs on a contact surface (hereinafter referred to as "friction surface") between the armature and the rotor. For that reason, the rotor, the armature, and a rotary shaft are rotated together by the aid of the driving force transmitted from the external power source through the belt. In other words, the clutch is turned on, and the driving force to be transmitted from the external power source through the belt is transmitted to the car air conditioning compressor through the rotor and the hub.

On the other hand, the energization of the electromagnetic coil of the stator is stopped to vanish the electromagnetic force. For that reason, the armature is separated from the rotor by the aid of a restoring force of a rubber member disposed between an outer metal fitting and an inner metal fitting configuring the hub. In other words, the clutch is turned off, and transmitting of the power to the car air conditioning compressor from the external power source through the rotor and the hub is stopped.

In recent years, for the purpose of improving a fuel efficiency, a reduction in size and weight of the electromagnetic clutch has been required by vehicle manufactures, resulting in requirements of a reduction in an axial dimension of the electromagnetic clutch and a reduction in a radial dimension of the rotor. In that case, abrasion powder generated due to the abrasion of the friction surface of the rotor and the friction surface of the armature may remain and be unlikely to be discharged.

PRIOR ART DOCUMENT

Patent Document

Patent Document 1 JP H06-193653 A

SUMMARY

The present disclosure has, in view of the above difficulties, an object to provide a friction clutch capable of discharging abrasion powder.

According to an aspect of the present disclosure, a friction clutch includes a rotor and an armature. The rotor is rotatable about a rotating shaft, and includes a groove forming portion having a groove on which a belt is attached on an outer side of the rotor in a radial direction centered on the rotating shaft, and a wall forming portion that is disposed on an inner side of the groove forming portion in the radial direction centered on the rotating shaft and has a first wall on a first end side in an axis line direction with respect to the rotating shaft. The armature is disposed on the first end side in the axis line direction with respect to the rotor and supported by the rotating shaft, and has a second wall facing the first wall. When the first wall and the second wall come in contact with each other, and a rotational force is transmitted from a driving source through the belt to the rotor, the rotor, the armature, and the rotating shaft are rotated together by a friction generated between the first and second walls. The groove forming portion includes a cover portion that is located on an outer side of the armature in the radial direction, and covers a radially outer end of the armature. The cover portion, the radially outer end of the armature, and the first wall define a discharge passage that has a ring shape centered on the rotating shaft and is open on the first end side in the axis line direction. The cover portion includes a spreading surface having a shape such that an area in a cross-sectional plane of the discharge passage that is orthogonal to the rotating shaft increases toward the first end side in the axis line direction.

With the above configuration, the abrasion powder generated by the abrasion of a friction surface of the first wall and a friction surface of the second wall can be discharged from the discharge passage due to the centrifugal force.

DESCRIPTION OF EMBODIMENTS

Figure 11:
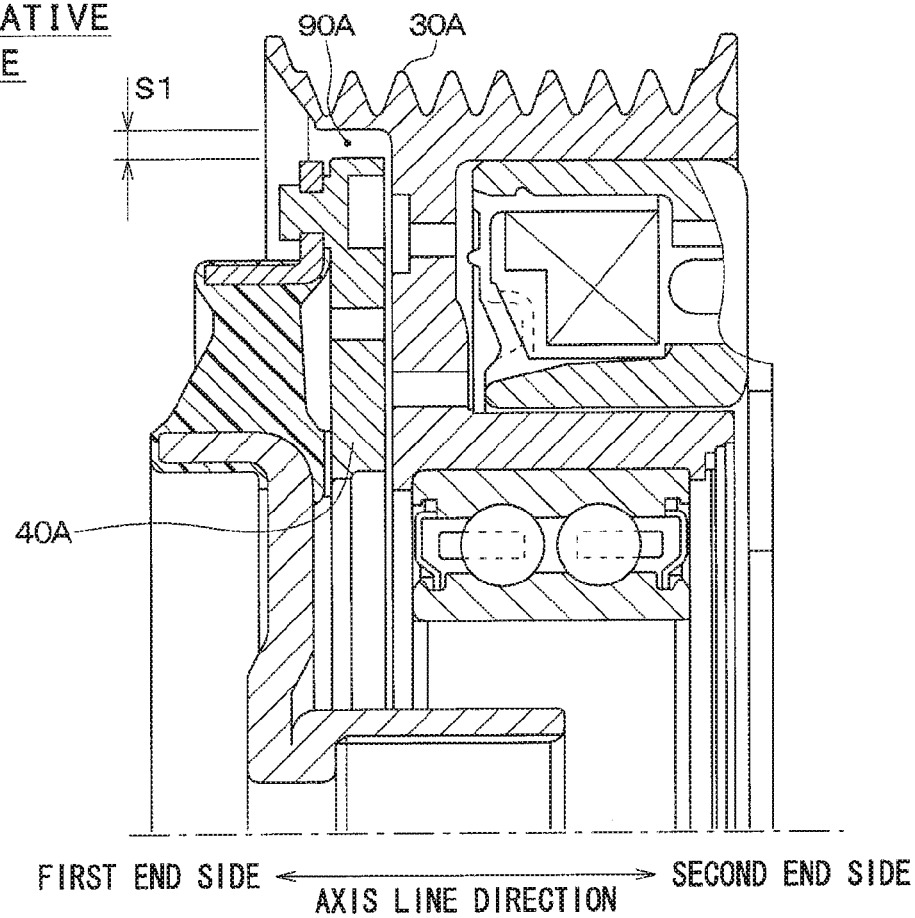
FIG. 11 is a cross-sectional view illustrating a part of an electromagnetic clutch in a comparative example of the present disclosure.

In order to reduce a size and a weight of an electromagnetic clutch, it is conceivable that an axial dimension of the electromagnetic clutch is reduced, or a radial dimension of a rotor is reduced. For example, when the axial dimension of the electromagnetic clutch is reduced without any change in a position of V-grooves on which a belt is attached in the rotor, a rotor 30A covers a radially outer side of an armature 40A as illustrated in FIG. 11. In particular, when the radial dimension of the rotor 30A is reduced, a distance S1 between the armature 40A and the rotor 30A in the radial direction is shortened. With the shortened distance S1, a gap 90A between the armature 40A and the rotor 30A is reduced. In this case, abrasion powder is generated due to abrasion between a friction surface of the rotor 30A and a friction surface of the armature 40A. However, as described above, when the gap 90A is reduced, the abrasion powder remains in the gap 90A, and the abrasion powder is unlikely to be discharged from the gap 90A.

Embodiments of the present disclosure will be described below with reference to the drawings.

Figure 1:
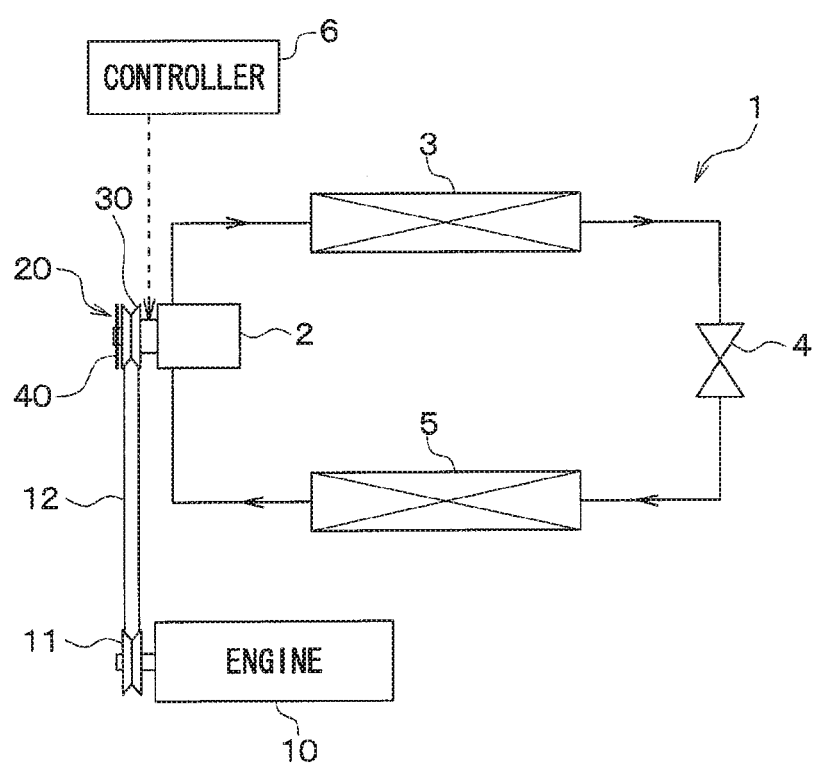
FIG. 1 is a schematic diagram illustrating a refrigeration cycle device in a vehicle air conditioning apparatus having an electromagnetic clutch according to an embodiment of the present disclosure.

FIG. 1 is a diagram illustrating an overall configuration of a refrigeration cycle device 1 of a vehicle air conditioning apparatus using an electromagnetic clutch that is an example of a friction clutch according to the present embodiment.

The refrigeration cycle device 1 includes a compressor 2, a radiator 3, an expansion valve 4, and an evaporator 5 which are connected to each other. The compressor 2 draws a refrigerant and compresses the refrigerant. The radiator 3 allows the discharged refrigerant from the compressor 2 to radiate heat. The expansion valve 4 depressurizes and expands the refrigerant that flows out of the radiator 3. The evaporator 5 evaporates the refrigerant that has been depressurized by the expansion valve 4 to exert a heat absorbing effect.

The compressor 2 is installed in an engine room of a vehicle. The compressor 2 drives a compression mechanism by a rotational drive force, to thereby draw the refrigerant from the evaporator 5 and compress the refrigerant. The rotational drive force is applied from an engine 10 used as an example of a traveling drive source through an electromagnetic clutch 20.

Meanwhile, any one of a fixed capacity type compression mechanism of which the discharge capacity is fixed and a variable capacity type compression mechanism of which the discharge capacity can be adjusted by a control signal input from the outside may be employed as the compression mechanism.

The electromagnetic clutch 20 that is an example of the friction clutch according to the present embodiment is configured by a pulley integrated electromagnetic clutch that is coupled with the compressor 2. The electromagnetic clutch 20 transmits the rotational drive force of the engine 10, which is applied from an engine side pulley 11 through a V-belt 12, to the compressor 2. The engine side pulley 11 is coupled with the rotational drive shaft of the engine 10.

The electromagnetic clutch 20 includes a rotor 30 and an armature 40. The rotor 30 configures a driving side rotating body that is rotated by the rotational drive force applied from the engine 10 through the V-belt 12. The armature 40 configures a driven side rotating body that is coupled to a rotating shaft 2a of the compressor 2. The electromagnetic clutch 20 couples the rotor 30 with the armature 40 or separates the rotor 30 from the armature 40, to thereby intermittently transmit the rotational drive force from the engine 10 to the compressor 2.

In other words, when the electromagnetic clutch 20 couples the rotor 30 to the armature 40, the rotational drive force of the engine 10 is transmitted to the compressor 2 and the refrigeration cycle device 1 operates. On the other hand, when the electromagnetic clutch 20 separates the rotor 30 from the armature 40, the rotational drive force of the engine 10 is not transmitted to the compressor 2, and the refrigeration cycle device 1 does not operate.

Next, a detailed configuration of the electromagnetic clutch 20 of the present embodiment will be described with reference to FIG. 2.

Figure 2:
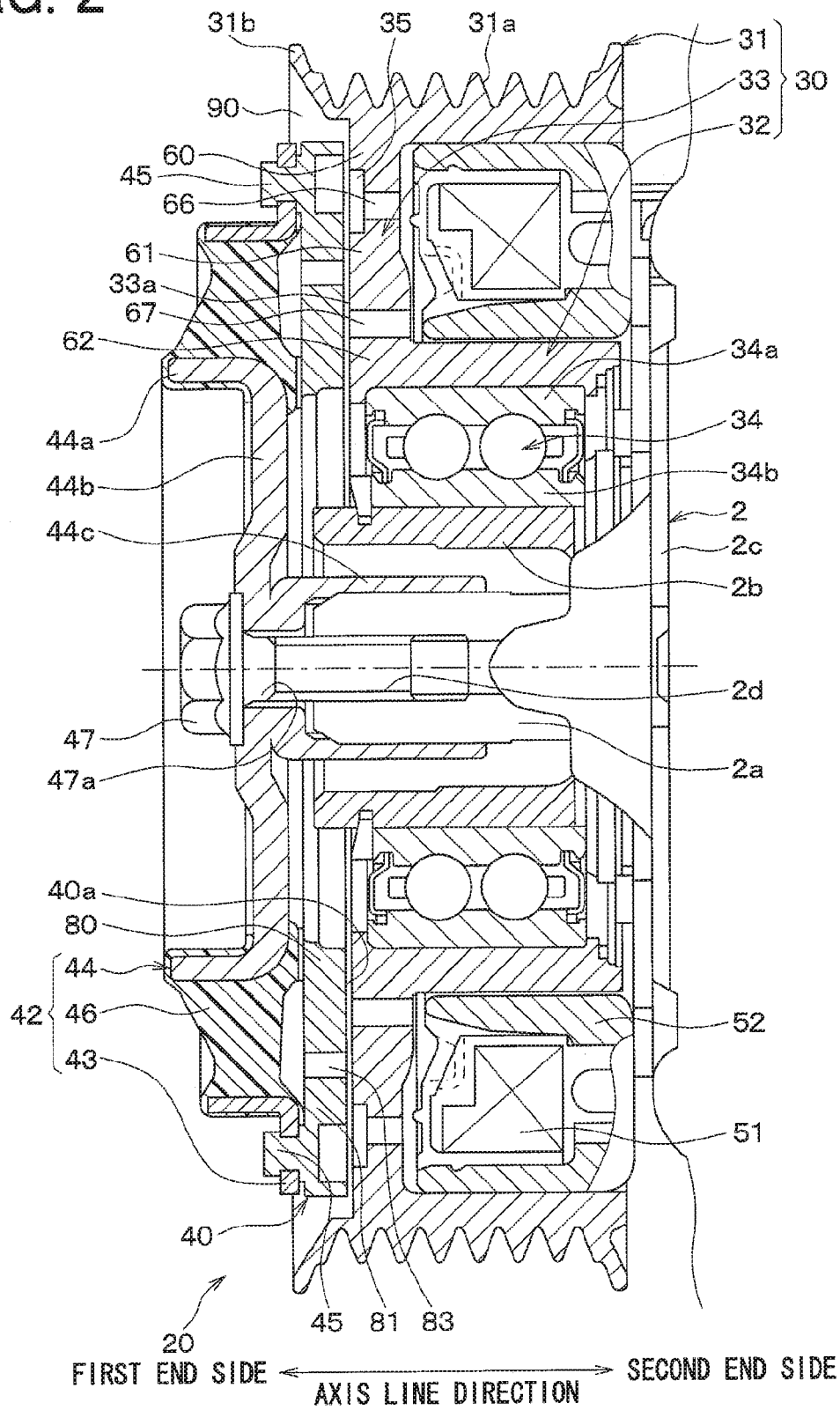
FIG. 2 is a cross-sectional view of the electromagnetic clutch according to the embodiment.
Figure 3:
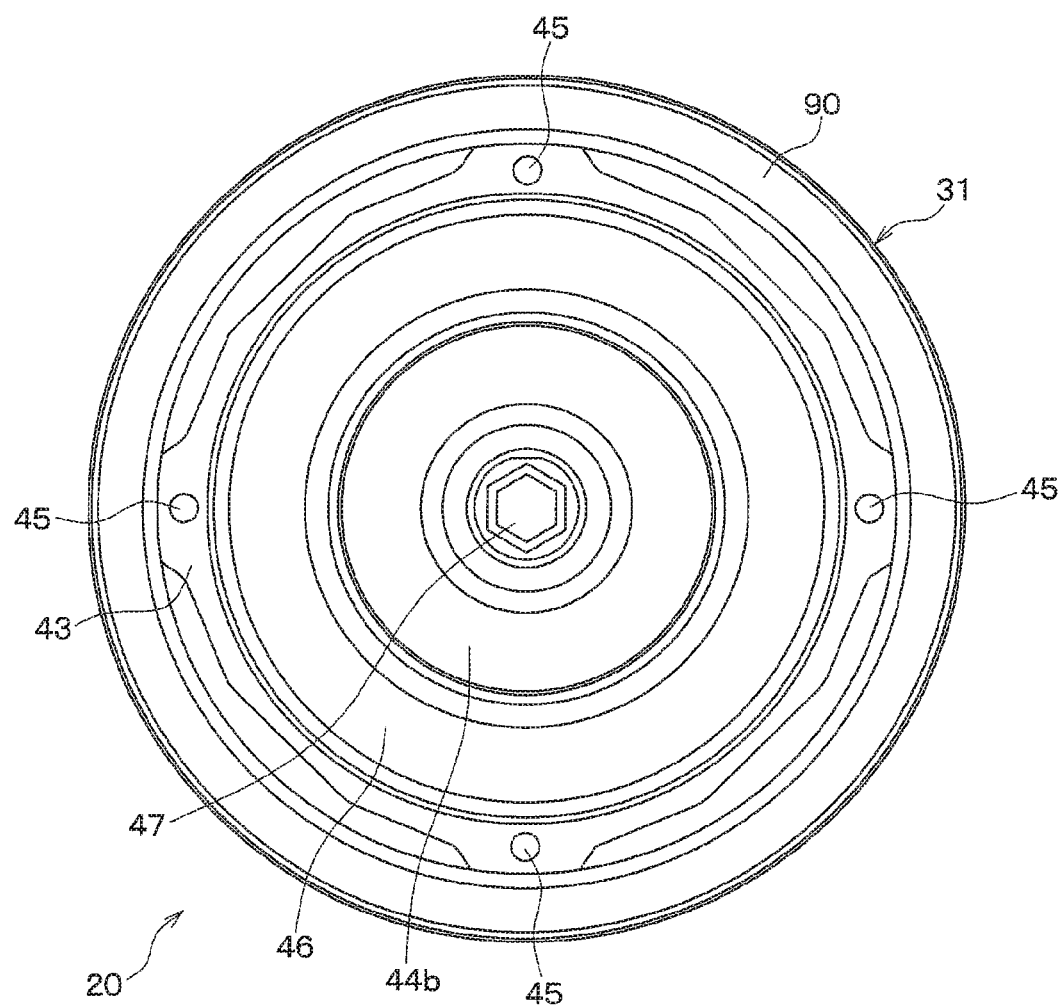
FIG. 3 is a diagram illustrating the electromagnetic clutch viewed from a first end side in an axis line direction according to the embodiment.

FIG. 2 is a cross-sectional view of the electromagnetic clutch 20 taken along the axis line direction. The axial cross-sectional view is a cross-sectional view of the electromagnetic clutch 20 that includes an axis of the rotating shaft 2a of the compressor 2 and is taken along the axis. FIG. 3 is a diagram illustrating the electromagnetic clutch 20 viewed from a first end side of the rotating shaft 2a of the compressor 2 in the axis line direction.

As illustrated in FIG. 2, the electromagnetic clutch 20 includes the rotor 30. First, the rotor 30 includes an outer cylindrical portion 31, an inner cylindrical portion 32, and an end surface portion 33.

The outer cylindrical portion 31 is formed into a cylindrical shape having a center line on the axis (one-dot chain line in FIG. 2) of the rotating shaft 2a of the compressor 2. The outer cylindrical portion 31 is made of a magnetic material (for example, iron). The outer cylindrical portion 31 may be used as an example of a groove forming portion having V-grooves 31a (grooves) on which a V-belt 12 is put. The V-grooves 31a are provided on a radially outer peripheral side of the outer cylindrical portion 31 with the axis as a center line.

The inner cylindrical portion 32 is disposed on a radially inner peripheral side of the outer cylindrical portion 31 with the axis of the rotating shaft 2a as a center line, and formed into a cylindrical shape with the axis of the rotating shaft 2a as an axis. The inner cylindrical portion 32 is made of a magnetic material (for example, iron).

An outer ring 34a of a ball bearing 34 is fixed to an inner peripheral side of the inner cylindrical portion 32. The ball bearing 34 rotatably fixes the rotor 30 to a housing 2c about the axis of the rotating shaft 2a as the center line, and the housing 2c configures an outer shell of the compressor 2. For that reason, an inner ring 34b of the ball bearing 34 is fixed to the housing 2c of the compressor 2 by a snap ring. The inner ring 34b of the ball bearing 34 is disposed on a radially outer side of a housing boss 2b that is formed on the housing 2c of the compressor 2. The housing boss 2b is formed into a cylindrical shape having a center line on the axis of the rotating shaft 2a of the compressor 2.

The end surface portion 33 is disposed between the first end side of the outer cylindrical portion 31 in the direction of the rotating shaft and the first end side of the inner cylindrical portion 32 in the direction of the rotating shaft. The end surface portion 33 is formed in a ring shape centered on the axis of the rotating shaft 2a.

Specifically, the end surface portion 33 includes ring members 60, 61, and 62. The ring members 60, 61, and 62 are formed into a ring shape centered on the axis of the rotating shaft 2a.

The ring member 60 of the present embodiment is disposed on the radially outer side of the ring member 61. The ring member 61 is disposed on the radially outer side of the ring member 62. Each of the ring members 60, 61, and 62 is made of a magnetic material (for example, iron).

A nonmagnetic portion 66 made of a nonmagnetic metal material is disposed between the ring members 60 and 61. The nonmagnetic portion 66 is formed into a ring shape centered on the axis of the rotating shaft 2a, and couples the ring members 60 and 61 with each other.

A nonmagnetic portion 67 made of a nonmagnetic metal material is disposed between the ring members 61 and 62. The nonmagnetic portion 67 is formed into a ring shape centered on the axis of the rotating shaft 2a, and couples the ring members 61 and 62 with each other.

The nonmagnetic portions 66 and 67 according to the present embodiment is made of a nonmagnetic metal material such as SUS304 (stainless steel) or copper. As the nonmagnetic portions 66 and 67, the nonmagnetic metal materials may be replaced with gaps defined into a circular arc shape.

According to the present embodiment, the outer cylindrical portion 31 is connected to the ring member 60 of the end surface portion 33, and the ring member 62 of the end surface portion 33 is connected to the inner cylindrical portion 32. The outer cylindrical portion 31, the ring members 60, 61, and 62 of the end surface portion 33, and the inner cylindrical portion 32 configure a magnetic circuit Ma as will be described later.

The first end side of the end surface portion 33 in the axis line direction is provided with a wall 33a orthogonal to the axis of the rotating shaft 2a. As will be described later, the wall 33a may be used as an example of the first wall having a friction surface that comes in contact with the armature 40. The end surface portion 33 may be used as an example of a wall forming portion having the first wall. Under the circumstance, in the present embodiment, a friction member 35 for increasing a friction coefficient of the end surface portion 33 is disposed on the first end side of the nonmagnetic portion 66 in the end surface portion 33 in the axis line direction. The friction member 35 is formed into a ring shape centered on the axis of the rotating shaft 2a. The friction member 35 is made of a nonmagnetic material. The friction member 35 is made of a nonmagnetic material. Specifically, a material, which is obtained by solidifying alumina with a resin, or a sintered material of metal powder (for example, aluminum powder) can be employed for the friction member.

The armature 40 is disposed on the second end side of the end surface portion 33 of the rotor 30 in the axis line direction. Specifically, the armature 40 is a ring-shaped member that is spread in a direction perpendicular to the rotating shaft 2a and provided with a through hole penetrating through the armature 40 at a center portion. The center of rotation of the armature 40 corresponds to the axis of the rotating shaft 2a.

The armature 40 includes ring members 80 and 81. The ring members 80 and 81 are formed into a ring shape centered on the axis of the rotating shaft 2a. The ring member 80 of the present embodiment is disposed on the radially inner side of the ring member 81 centered on the axis of the rotating shaft 2a. Each of the ring members 80 and 81 is made of a magnetic material (for example, iron).

A nonmagnetic portion 83 made of a nonmagnetic metal material is disposed between the ring members 80 and 81. The nonmagnetic portion 83 is formed into a ring shape centered on the axis of the rotating shaft 2a, and couples the ring members 80 and 81 with each other. The nonmagnetic portion 83 according to the present embodiment is made of a nonmagnetic metal material such as SUS304 (stainless steel) or copper. As the nonmagnetic portion 83, the nonmagnetic metal material may be replaced with a gap defined into a circular arc shape.

As will be described later, a discharge passage 90 for discharging abrasion powder is provided on the radially outer side of the armature 40 according to the present embodiment with respect to the rotating shaft 2a. The discharge passage 90 is formed into a ring shape centered on the axis of the rotating shaft 2a. The shape of the discharge passage 90 will be described later.

A wall 40a orthogonal to the axis of the rotating shaft 2a is disposed on a second end side of the armature 40 in the axis line direction. The wall 40a may be used as an example of the second wall facing the wall 33a of the end surface portion 33 of the rotor 30. As will be described later, the wall 40a includes a friction surface that comes in contact with the wall 33a of the end surface portion 33 of the rotor 30.

The electromagnetic clutch 20 includes a hub 42. The hub 42 includes an outer metal fitting 43 and an inner metal fitting 44 together with the armature 40. The outer metal fitting 43 is disposed on the first end side of the armature 40 in the axis line direction. The outer metal fitting 43 is formed into a ring shape centered on the axis of the rotating shaft 2a. The outer metal fitting 43 and the armature 40 are fixed to each other by multiple fastening portions 45. The fastening portions 45 fixes the outer metal fitting 43 and the armature 40 to each other by caulking. FIG. 3 illustrates four fastening portions 45. The inner metal fitting 44 is disposed on the radially inner side of the outer metal fitting 43 centered on the axis of the rotating shaft 2a.

The inner metal fitting 44 includes an inner cylindrical portion 44a, a ring portion 44b, and an inner fitting portion 44c. The inner cylindrical portion 44a is formed into a cylindrical shape centered on the axis of the rotating shaft 2a. The inner fitting portion 44c is disposed on a radially inner side of the inner cylindrical portion 44a centered on the axis of the rotating shaft 2a, and formed into a cylindrical shape with the axis of the rotating shaft 2a as an axis. The rotating shaft 2a is fitted to a hollow portion of the inner fitting portion 44c. The ring portion 44b is formed into a ring shape, and couples a second end side of the inner cylindrical portion 44a in the axis line direction with a first end side of the inner fitting portion 44c in the axis line direction. The ring portion 44b of the inner metal fitting 44 has a screw hole 47a opened on the first end side in the axis line direction. A bolt 47 is fastened into a screw hole 2d of the rotating shaft 2a of the compressor 2 in a state where the bolt 47 penetrates through the screw hole 47a whereby the inner metal fitting 44 is fixed to the rotating shaft 2a. In other words, the hub 42 is fixed to the rotating shaft 2a by the bolt 47.

In the present embodiment, a cylindrical rubber 46 that is an elastic member is bonded by vulcanization between the outer metal fitting 43 and the inner metal fitting 44. The rubber 46 can be made of EPDM (ethylene propylene diene terpolymer rubber).

With the above configuration, when the armature 40, the hub 42, and the rotating shaft 2a of the compressor 2 are coupled with each other, and the rotor 30 is coupled with the armature 40, the armature 40, the hub 42, and the rotating shaft 2a of the compressor 2 are rotated together with the rotor 30.

The rubber 46 exerts an elastic force on the hub 42 in a direction of separating the armature 40 from the rotor 30. A gap having a predetermined distance is provided between the wall 40a of the armature 40 coupled with the hub 42 and the wall 33a of the rotor 30 in a state where the rotor 30 is separated from the armature 40 due to the elastic force.

The electromagnetic clutch 20 includes an electromagnetic coil 51 and a stator housing 52. The electromagnetic coil 51 is disposed between the outer cylindrical portion 31 and the inner cylindrical portion 32 of the rotor 30, and formed into a ring shape centered on the axis of the rotating shaft 2a. According to the electromagnetic coil 51 of the present embodiment, the electromagnetic coil 51 is configured by winding a wire made of copper or aluminum on a resin spool in a multi-row or multilayer manner. In the present embodiment, the electromagnetic coil 51 is fixed to the stator housing 52 by fitting and fastening.

In the present embodiment, the stator housing 52 is made of a magnetic material (for example, iron), and fixed to the housing 2c of the compressor 2 by a fixing tool such as a snap ring. The stator housing 52 is formed into a ring shape centered on the axis of the rotating shaft 2a, and formed in a U-shaped cross-section so as to surround the electromagnetic coil 51 from the radially inner side, the radially outer side, and the second end side in the axis line direction. The electromagnetic coil 51 and the stator housing 52 are fixed to the housing 2c.

In this example, a gap is provided between the stator housing 52 and the inner cylindrical portion 32 of the rotor 30. In addition, a gap is provided between the stator housing 52 and the outer cylindrical portion 31 of the rotor 30. A controller 6 in FIG. 1 controls the energization of the electromagnetic coil 51 on the basis of a control signal output from an air conditioning ECU (electronic control unit).

Figure 4:
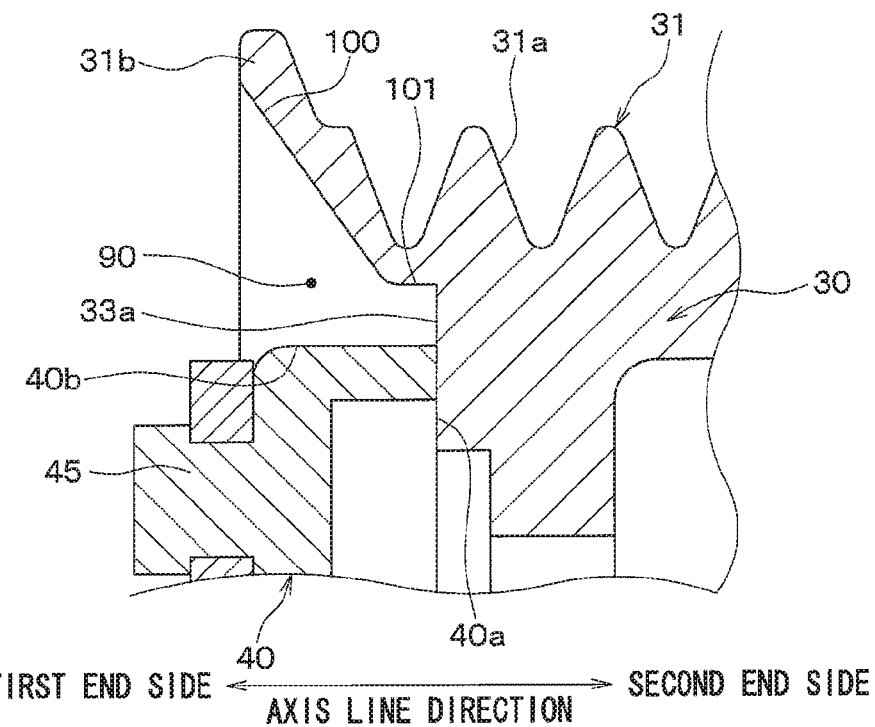
FIG. 4 is a cross-sectional view illustrating a part of the electromagnetic clutch according to the embodiment.

Next, the discharge passage 90 according to the present embodiment will be described in detail with reference to FIG. 4.

The discharge passage 90 is defined by the wall 33a of the rotor 30, a cover portion 31b of the rotor 30, and a radially outer end 40b of the armature 40. The cover portion 31b is disposed in the outer cylindrical portion 31, and located on the radially outer side of the armature. The cover portion 31b covers the radially outer end 40b of the armature 40 from the radially outer side of the rotating shaft 2a. A tapered surface 100 and a parallel surface 101 are provided on the radially inner side of the cover portion 31b. The tapered surface 100 (spreading surface) is inclined so that an area of a cross-sectional plane of the discharge passage 90 which is orthogonal to the axis of the rotating shaft 2a becomes larger toward the first end side in the axis line direction. The parallel surface 101 is disposed between the tapered surface 100 and the wall 33a, and is provided in parallel to the axis line direction.

Next, the operation of the electromagnetic clutch 20 according to the present embodiment will be described.

First, when the controller 6 does not implement the energization of the electromagnetic coil 51, the gap is provided between the armature 40 and the rotor 30 due to the elastic force of the rubber 46. In other words, the electromagnetic clutch 20 becomes in an off-state.

Then, the controller 6 starts the energization of the electromagnetic coil 51. In this situation, a magnetic circuit in which a magnetic flux passes through the stator housing 52, the armature 40, and the rotor 30 is formed. A magnetic force generated by the magnetic circuit serves as an attractive magnetic force that couples the rotor 30 with the armature 40. For that reason, the rotor 30 and the armature 40 can be coupled with each other due to the magnetic force generated by the magnetic circuit. In other words, the electromagnetic clutch 20 becomes in the on-state. In this situation, a friction occurs between the friction surface of the rotor 30 and the friction surface of the armature 40 due to the rotational drive force of the engine 10 which is transmitted from the engine side pulley 11 through the V-belt 12. With the above configuration, the rotor 30, the armature 40, the hub 42, and the rotating shaft 2a are rotated together due to the rotational drive force transmitted from the engine side pulley 11 through the V-belt 12. In other words, the rotational drive force from the engine 10 can be transmitted to the compressor 2 by the electromagnetic clutch 20. In other words, the electromagnetic clutch 20 becomes in the on-state.

Thereafter, the controller 6 completes the energization of the electromagnetic coil 51. For that reason, no magnetic circuit is formed, and the attractive magnetic force is vanished. As a result, the gap is provided between the armature 40 and the rotor 30 due to the elastic force of the rubber 46. With the provision of the gap, the transmission of the rotational drive force from the engine 10 to the compressor 2 is stopped. In other words, the electromagnetic clutch 20 becomes in the off-state.

As described above, the electromagnetic clutch 20 alternately repeats the on-state and the off-state. With this operation, the friction surface of the rotor 30 is fractioned against the friction surface of the armature 40 to generate the abrasion powder. However, the abrasion powder is discharged to the first end side in the axis line direction through the discharge passage 90 due to the centrifugal force.

According to the present embodiment described above, in the electromagnetic clutch 20, the armature 40 has the wall 40a that is disposed on the first end side in the axis line direction with respect to the rotor 30, supported to the rotating shaft 2a, and faces the wall 33a. The rotor 30 includes the outer cylindrical portion 31 that is formed into a ring shape centered on the rotating shaft 2a, disposed on the radially outer side centered on the rotating shaft 2a, and has they-grooves 31a on which the V-belt 12 is engaged. The rotor 30 has the end surface portion 33 that is disposed on the radially inner side of the outer cylindrical portion 31, formed into a ring shape centered on the rotating shaft 2a, and has the wall 33a on the first end side of the rotating shaft 2a in the axis line direction. The rotor 30 is rotatably supported to the housing 2c of the compressor 2 about the rotating shaft 2a. Each of the wall 40a of the armature 40 and the wall 33a of the rotor 30 has a friction surface. A friction occurs between the walls 40a and 33a due to a rotational force transmitted from the engine 10 through the V-belt 12 in a state where the wall 40a of the armature 40 comes in contact with the wall 33a of the rotor 30, and the rotor 30, the armature 40, and the rotating shaft 2a are rotated together. The outer cylindrical portion 31 of the rotor 30 includes the cover portion 31b that covers the radially outer end of the armature 40 from the radially outer side. The cover portion 31b, the radially outer end 40h of the armature 40, and the wall 33a of the rotor 30 define the discharge passage 90 that is formed into a ring shape centered on the rotating shaft 2a, and opened on the first end side in the axis line direction for discharging the abrasion powder generated by the friction between the friction surface of the wall 40a and the friction surface of the wall 33a. The cover portion 31b includes the tapered surface 100 that is shaped such that an area of the cross sectional plane of the discharge passage 90 which is orthogonal to the axis of the rotating shaft 2a becomes larger toward the first end side in the axis line direction.

In this example, as illustrated in FIG. 11, when a distance S1 between the armature 40 and the rotor 30 is short, if the abrasion powder remains in the gap 90A between the armature 40 and the rotor 30, a magnetic leakage occurs due to the abrasion powder. For that reason, a holding torque for coupling the rotor 30 with the armature 40 cannot be ensured. Therefore, a slip occurs between the friction surface of the rotor 30 and the friction surface of the armature 40. Further, when the abrasion powder remaining in the gap 90A adheres to the friction surface of the rotor 30 and the friction surface of the armature 40, the slip occurs between the friction surface of the rotor 30 and the friction surface of the armature 40. In this way, when the slip occurs between the rotor 30 and the armature 40, a temperature of the rotor 30 and the armature 40 is raised due to the friction between the rotor 30 and the armature 40 to operate a temperature fuse. The temperature fuse is connected in series with a coil winding configuring the electromagnetic coil. For that reason, the electromagnetic coil is no longer energized due to the operation of the temperature fuse. Therefore, clutch on/off operation of the electromagnetic clutch is no longer implemented, and the refrigeration cycle device does not also operate.

On the contrary, in the present embodiment, as described above, the cover portion 31b includes the tapered surface 100 that is shaped such that an area of the cross sectional plane of the discharge passage 90 which is orthogonal to the axis of the rotating shaft 2a becomes larger toward the first end side in the axis line direction. Therefore, the abrasion powder generated by the friction between the friction surface of the wall 40a and the friction surface of the wall 33a can be discharged toward the first end side in the axis line direction through the discharge passage 90 due to the centrifugal force. Therefore, the slip can be prevented from occurring between the rotor 30 and the armature 40 due to the abrasion powder.

As illustrated in FIGS. 5 to 9, the discharge passage 90 may be provided. Referring to FIGS. 5 to 9, the same reference numerals or symbols as those in FIGS. 1 and 4 indicate identical parts, and their description will be omitted.

Figure 5:
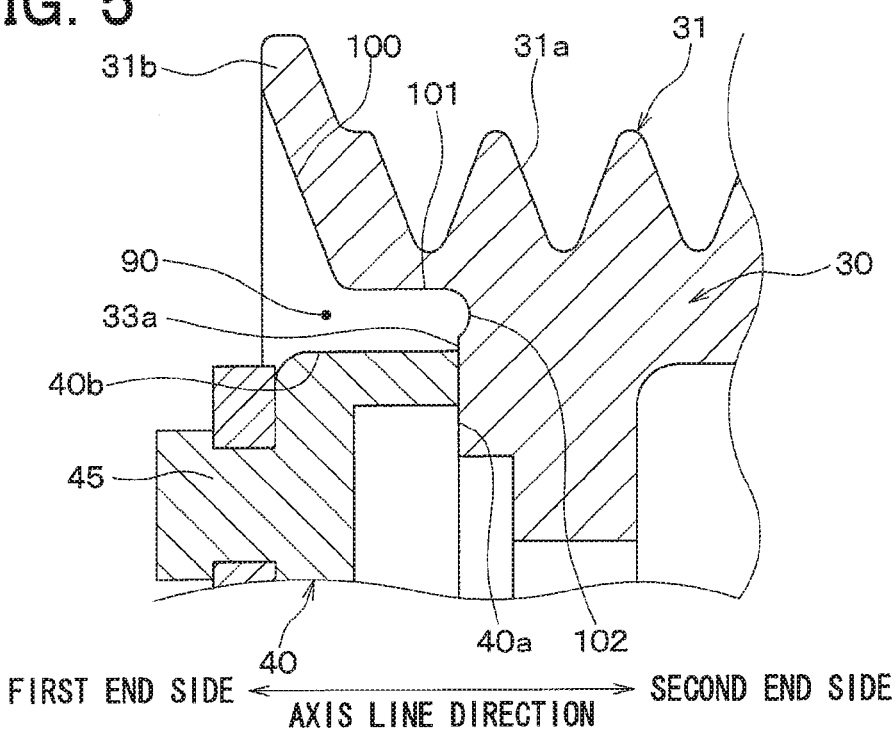
FIG. 5 is a cross-sectional view illustrating a part of the electromagnetic clutch according to a first modification of the embodiment.

Referring to FIG. 5, the tapered surface 100, the parallel surface 101, and a curved portion 102 are provided radially inside of the cover portion 31b. In FIG. 5, the curved portion 102 has a recess having a curved shape in cross-section between the parallel surface 101 and the wall 33a.

Figure 6:
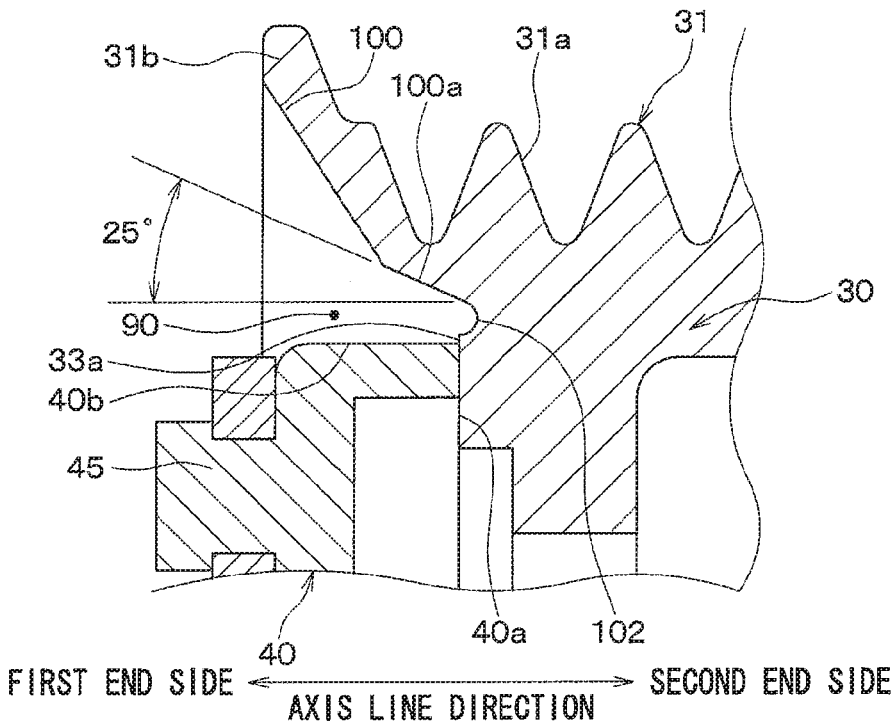
FIG. 6 is a cross-sectional view illustrating a part of the electromagnetic clutch according to a second modification of the embodiment.
Figure 7:
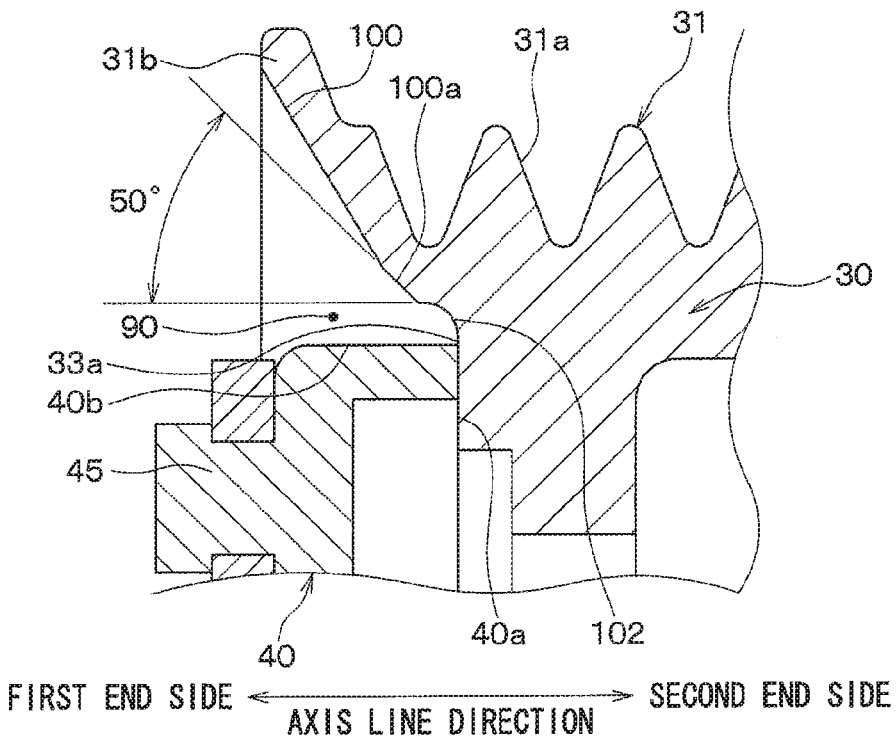
FIG. 7 is a cross-sectional view illustrating a part of the electromagnetic clutch according to a third modification of the embodiment.

Referring to FIGS. 6 and 7, the tapered surface 100, a tapered surface 100a, and a curved portion 102 are provided radially inside of the cover portion 31b. The tapered surface 100a is inclined so that an area of the cross-sectional plane of the discharge passage 90 which is orthogonal to the axis of the rotating shaft 2a becomes larger toward the first end side in the axis line direction. The tapered surface 100a is located between the tapered surface 100 and the curved portion 102.

Referring to FIG. 6, a taper angle θ defined between the tapered surface 100a and the axis line direction clockwise is 25°. The taper angle of the tapered surface 100 is larger than the taper angle of the tapered surface 100a. In addition, referring to FIG. 7, the taper angle θ defined between the tapered surface 100a and the axis line direction clockwise is 50°.

Figure 8:
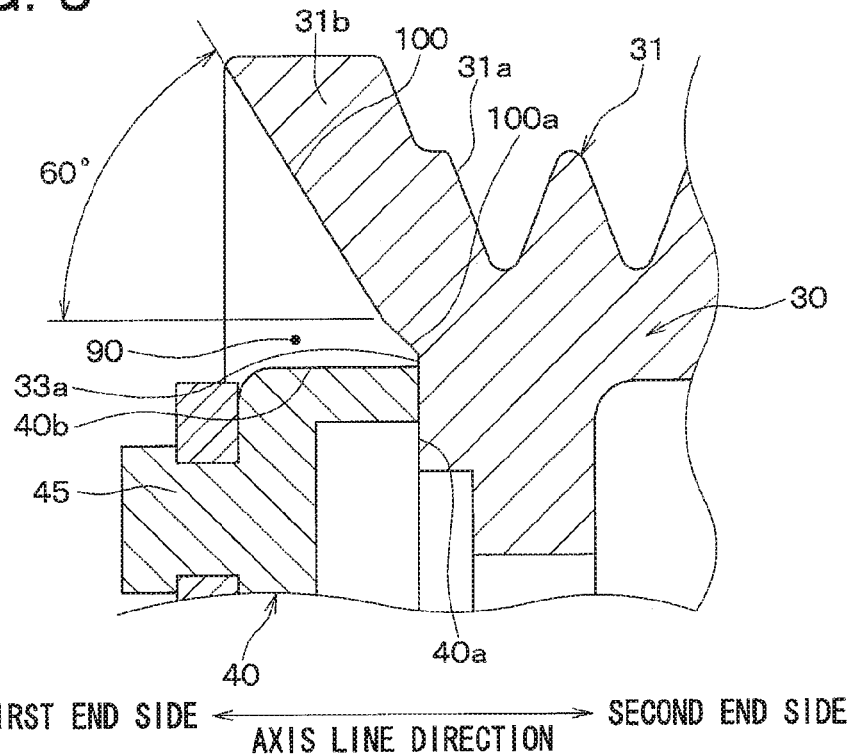
FIG. 8 is a cross-sectional view illustrating a part of the electromagnetic clutch according to a fourth modification of the embodiment.
Figure 9:
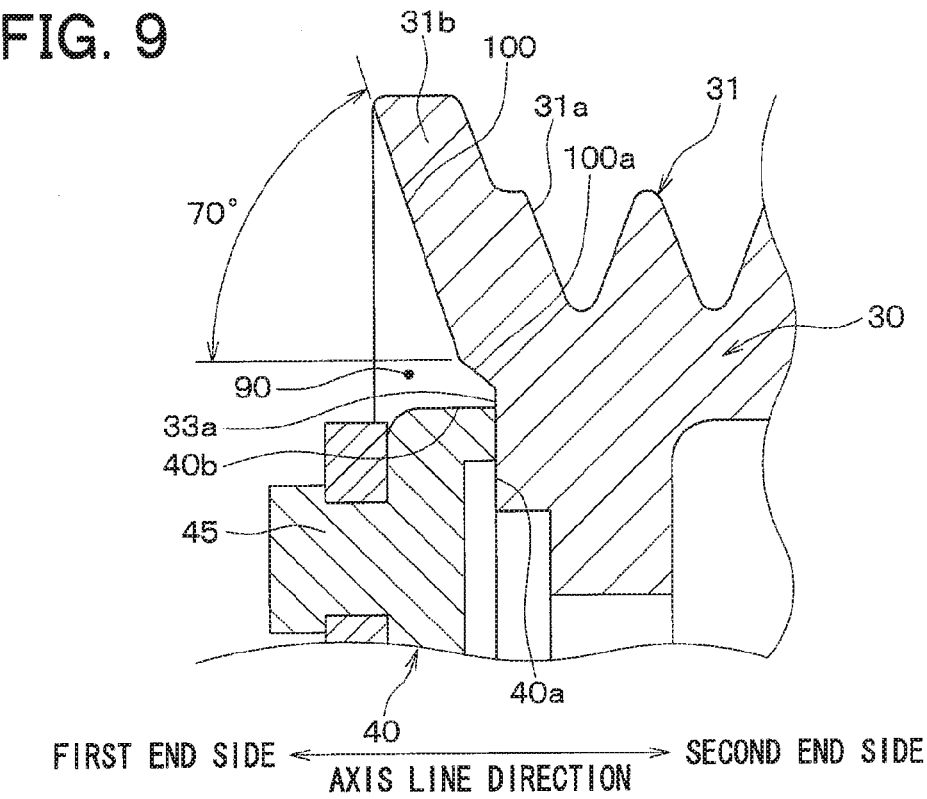
FIG. 9 is a cross-sectional view illustrating a part of the electromagnetic clutch according to a fifth modification of the embodiment.

In the cover portion 31b of FIGS. 8 and 9, the tapered surface 100a is provided between the tapered surface 100 and the wall 33a. In the cover portion 31b of FIG. 8, the taper angle θ defined between the tapered surface 100 and the axis line direction clockwise is 60°. In the cover portion 31b of FIG. 8, the taper angle θ defined between the tapered surface 100 and the axis line direction clockwise is 70°. The taper angle of the tapered surface 100 is larger than the taper angle of the tapered surface 100a.

Figure 10:
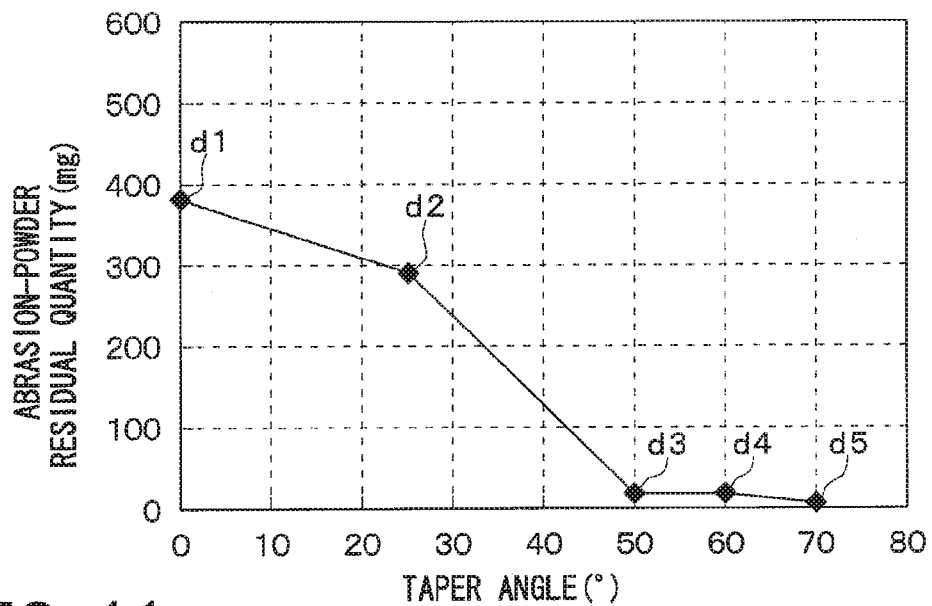
FIG. 10 is a diagram illustrating experimental results of abrasion powder elimination according to the embodiment.

FIG. 10 show results of verification experiments for confirming the effect of eliminating the abrasion powder in the respective discharge passages 90 of FIGS. 5, 6, 7, 8, and 9. In FIG. 10, the axis of ordinate indicates the quantity of abrasion powder (specifically, magnetized iron powder) remaining in the discharge passage 90, and the axis of abscissa indicates the taper angle θ.

A plot d1 represents an experimental result of the electromagnetic clutch 20 having the discharge passage 90 in FIG. 5. A plot d2 represents an experimental result of the electromagnetic clutch 20 having the discharge passage 90 in FIG. 6. A plot d3 represents an experimental result of the electromagnetic clutch 20 having the discharge passage 90 in FIG. 7. A plot d4 represents an experimental result of the electromagnetic clutch 20 having the discharge passage 90 in FIG. 8. A plot d5 represents an experimental result of the electromagnetic clutch 20 having the discharge passage 90 in FIG. 9.

As is understood from the plot d1 to the plot d5 in FIG. 10, when the taper angle θ defined between the tapered surface 100 and the axis line direction is set to 50° or more, the residual amount of abrasion powder in the discharge passage 90 can be surely reduced.

In the electromagnetic clutch 20 of FIG. 5, since the parallel surface 101 that is in parallel to the axis line direction configures the discharge passage 90, the taper angle θ of the plot d1 in FIG. 10 is set to 0°.

In the above embodiment, the example in which the rotor 30 and the armature 40 are coupled with each other by the magnetic force generated by the magnetic circuit has been illustrated. Instead, the rotor 30 and the armature 40 may be coupled with each other by a force other than the magnetic force.

The present disclosure is not limited to the above-described embodiments and is capable of being suitably changed within the scope disclosed in Claims.

The invention claimed is:

1. A friction clutch, comprising:
a rotor that is rotatable about a rotating shaft, and includes a groove forming portion having a groove on which a belt is attached on an outer side of the rotor in a radial direction centered on the rotating shaft, and a wall forming portion that is disposed on an inner side of the groove forming portion in the radial direction centered on the rotating shaft and has a first wall on a first end side in an axis line direction with respect to the rotating shaft; and
an armature that is disposed on the first end side in the axis line direction with respect to the rotor and supported by the rotating shaft, and has a second wall facing the first wall, wherein
when the first wall and the second wall come in contact with each other, and a rotational force is transmitted from a driving source through the belt to the rotor, the rotor, the armature, and the rotating shaft are rotated together by a friction generated between the first and second walls,
the groove forming portion includes a cover portion that is located on an outer side of the armature in the radial direction, and covers a radially outer end of the armature,
the cover portion, the radially outer end of the armature, and the first wall define a discharge passage that has a ring shape centered on the rotating shaft and is open on the first end side in the axis line direction,
the cover portion includes a spreading surface having a shape such that an area in a cross-sectional plane of the discharge passage that is orthogonal to the rotating shaft increases toward the first end side in the axis line direction, the cover portion includes a parallel surface that is disposed on a second end side in the axis line direction with respect to the spreading surface and is parallel to the axis line direction of the rotating shaft, and a length of the parallel surface in the axis line direction of the rotating shaft is shorter than a distance in the radial direction between the parallel surface and the radially outer end of the armature.

2. The friction clutch according to claim 1, wherein the rotor includes a curved portion having a recess that has a curved shape in cross-section between the parallel surface of the cover portion and the first wall.

* * * * *